Nov. 8, 1932.   R. PORCELLO   1,887,427
WHEELED DEVICE
Filed April 6, 1932
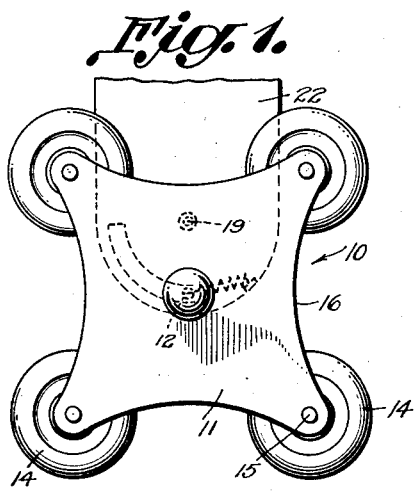
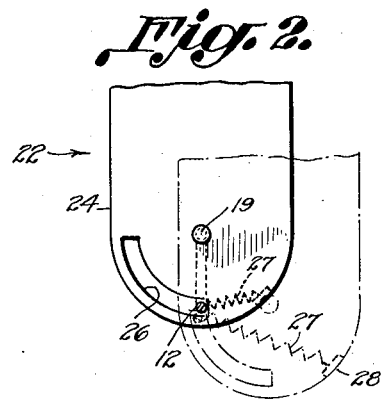
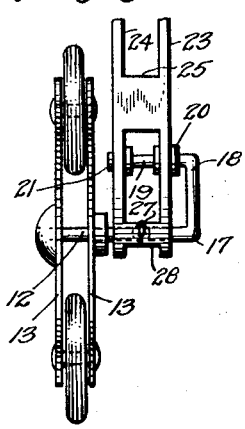
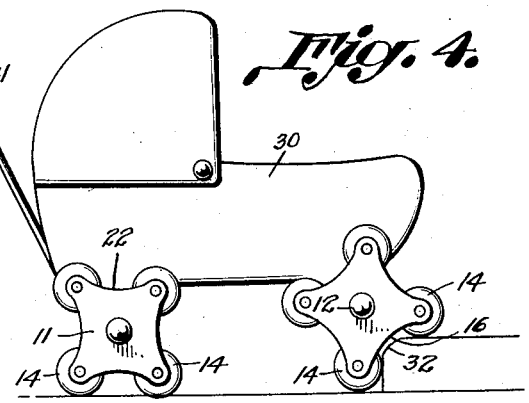
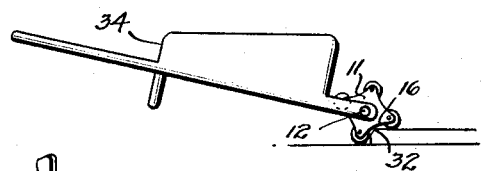
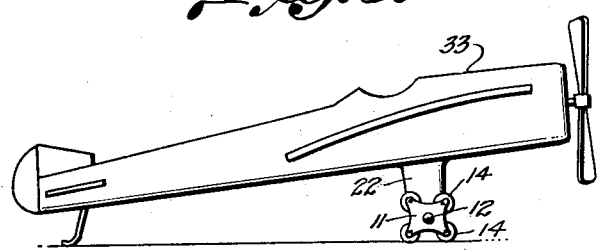
Inventor
*Raphael Porcello*
By *Miller + Miller*
Attorneys Patented Nov. 8, 1932

1,887,427

UNITED STATES PATENT OFFICE

RAPHAEL PORCELLO, OF RICHMOND HILL, NEW YORK

WHEELED DEVICE

Application filed April 6, 1932. Serial No. 603,600.

This invention relates to a wheeled device, and has for an object to provide an improved wheeled device suitable for vehicles of various nature.

A further object of this invention is to provide an improved wheeled device, which may have a spring mechanism for the vehicle combined with the wheeled device.

Still a further object of this invention is to provide a wheeled device which can travel over a very rough surface and still be able to travel thereover without transmitting any violent shock of the vehicle supported by the wheeled device.

Still a further object of this invention is to provide a wheeled device which will enable the vehicle supported thereby to climb or descend curb stones or similar obstructions with great facility.

Yet another object of this invention is to provide an improved wheeled device which is especially suitable for baby carriages, enabling the baby carriage to be taken up and down a curb stone with great ease, enabling it to mount or dismount on a curb stone easily without the necessity of the operator having to tilt the vehicle to get it over the curb stone.

Yet a further object of this invention is to provide an improved wheeled device which may be used for other vehicles as well, such as aeroplanes, wheelbarrows or any other type of vehicle to which it may be applied.

Yet a further object of this invention is to provide an improved wheeled device consisting of a wheel operating on a main axle and having a plurality of small wheels affixed on the periphery of the main wheel, there being three, four or more small wheels individually affixed on the main wheel at several spaced points thereabout.

Still another object of this invention is to provide a spring mounting and support for the axle of the main wheel, which spring mounting may or may not take the place of the usual spring provided on the vehicle.

With the foregoing and other objects in view, as will hereinafter become apparent, this invention comprises the constructions, combinations, and arrangements of parts, hereinafter set forth, disclosed and shown on the accompanying drawing. In this drawing, Figure 1 is a front elevation of the wheel, Figure 2 is a front elevation of the support, the wheel being removed to show the slot that the axle moves in taking the place of the springs commonly used, Figure 3 is an end view of one of the wheels showing the shape of the individual axle, Figure 4 shows wheels applied to the baby carriage, Figure 5 shows wheels applied to the aeroplane landing gear, and Figure 6 shows wheels applied to the wheelbarrow.

The wheeled device comprising this invention shown at 10 consists of a main wheel member 11, mounted for rotation on axle 12, the wheel 11 consisting of two plate members 13, having a plurality of small wheels, in this case 4, mounted between the plates 13, the wheels 14 each being individually supported on individual axles 15, connecting the plates 13 of the main wheel 11. The plates 13 are each recessed between the axles 15 as shown at 16, so as to enable it to clear any obstructions, as clearly shown in Figures 4 and 6.

The axle 12 has two right angular bends 17 and 18 leading to reversely bent portion 19, which is simply supported as at 20 and 21 in the vehicle support 22. This vehicle support 22 consists of a pair of plates 23 and 24 parallel to each other and secured together by a bridging member 25, the axle portions 12 and 19, passing through each of these plate members 23 and 24. A slot 26 concentric with the axle 19 receives the axle portion 12.

The axle portion 12 is secured by a spring member 27 to another bridge member 28 securing the support portions 23 and 24 together. The spring 27 normally holds the supporting member 22 in the full position shown in Figure 2, but when there is an excess pressure exerted downwardly by the vehicle on the support 22, it allows the support 22 to swing downwardly with the axle 19 as the axle portion 12 travels toward the upper portion of the slot. By making the spring 27 of suitable strength, a suitable spring suspension member is provided for the vehicle.

As previously set forth, the vehicle may be of any suitable nature, thus, in Figure 4, there is shown one form of vehicle to which this wheeled device 10 has been secured, this vehicle comprising a baby carriage 30 having the usual handle 31. In operation the baby carriage 30 is pushed along by the handle 31 in the usual manner supported on any two individual wheels 14 of each wheel device 11, there being obviously four wheel devices 11 secured thereto by means of the support 22 extending from each corner of this baby carriage 30. When an obstruction is reached, such as a curbstone shown at 32, the particular wheels 14 striking the curbstone will stop and the wheel device 11 will rotate about the axle 12 as a whole enabling the next individual wheel 14 to pivot onto the top of the curbstone. Then the wheel 14 that struck the curbstone will merely rise up on top of the curbstone. In the same way the rear wheels will mount the curbstone. This saves the operator of the baby carriage from the necessity of having to tilt the carriage as it will automatically mount and in a similar manner automatically dismount from the curbstone with the least amount of shock to the baby in the carriage and with the least amount of tilting of the carriage.

In Figure 5 the same type of wheeled device is shown as applied to an aeroplane 33, the wheel device in this form acting as a landing carriage. When the aeroplane lands and an obstruction is struck as it rolls along, the wheel, instead of nosing over as the ordinary aeroplane would, the wheel device 11 merely rotates about its axle 12 and climbs over the obstruction.

In Figure 6 a wheelbarrow has been shown as making use of this wheeled device, the wheelbarrow 34 having a wheel device 11 secured thereto at the axle 12. The usual difficulty of causing a wheelbarrow to mount up or down a curbstone is too well known to need further discussion. With this invention, however, when a curbstone is struck, the wheeled device merely pivots around the axle 12 allowing the individual wheels to climb over the curbstone, as clearly shown in Figure 6.

The vehicles illustrated and particularly explained, are only a few of the many types of vehicles for which this wheeled device may be suitable.

The novel features and the operation of this device will be apparent from the foregoing description. While the device has been shown and the structure described in detail, it is obvious that this is not to be limited to the exact form disclosed except as claimed and that changes may be made therein within the scope of what is claimed, without departing from the spirit of the invention.

Having thus set forth and disclosed the nature of this invention, what is claimed is:

1. A wheeled device comprising a main wheel member, a plurality of individual wheel members axially secured to said main wheel member about the periphery thereof, a supporting member adapted to be mounted on a vehicle, an axle member for said main wheel member secured to said supporting member, said supporting member having an axial aperture therein and an axial slot therein concentric with said axial aperture, said main wheel member axle being substantially L-shaped, the small arm of said L-shaped axle being pivoted in the axial aperture in said supporting member, and said longer arm of said L-shaped axle projecting through the concentric axial slot in said support, and pivotally or rotatably supporting said main wheel member on the end thereof.

2. A wheeled device comprising a main wheel member, a plurality of individual wheel members axially secured to said main wheel member about the periphery thereof, a supporting member adapted to be mounted on a vehicle, an axle member for said main wheel member secured to said supporting member, said supporting member having an axial aperture therein and an axial slot therein concentric with said axial aperture, said main wheel member axle being substantially L-shaped, the small arm of said L-shaped axle being pivoted in the axial aperture in said supporting member, and said longer arm of said L-shaped axle projecting through the concentric axial slot in said support, and pivotally or rotatably supporting said main wheel member on the end thereof, this concentric slot commencing adjacent the bottom of said supporting member, and resilient means secured to said supporting member and to the longer arm of said L-shaped axle, tending to hold said axle member adjacent the bottom of said slot.

3. A wheeled device for vehicles comprising a support adapted to be secured to the vehicle, said supporting consisting of a pair of spaced parallel plates, and bridge means joining said plates into a unit, said support having a pair of aligned axial apertures therethrough, and a pair of aligned axial slots therethrough concentric with said axial apertures, and extending 90° from the bottom of said support, an L-shaped axle, the shorter arm of said L-shaped axle being pivotally mounted in said axial aperture and the longer arm of said axle projecting through said concentric axial slot, said longer arm being adapted to travel along said axial slot, spring means secured to said longer arm and to said bridging means of said support, tending to hold said longer arm of said axle adjacent the bottom of said slot, and a wheel member rotatably supported on the end of said longer arm of said L-shaped axle.

4. A wheeled device for vehicles comprising a support adapted to be secured to the vehicle, said support consisting of a pair of spaced parallel plates, and bridge means joining said plates into a unit, said support having a pair of aligned axial apertures therethrough, and a pair of aligned axial slots therethrough concentric with said axial apertures, and extending 90° from the bottom of said support, an L-shaped axle, the shorter arm of said L-shaped axle being pivotally mounted in said axial aperture and the longer arm of said axle projecting through said concentric axial slot, spring means secured to said longer arm and to said bridging means of said support, tending to hold said longer arm of said axle adjacent the bottom of said slot, a wheel member rotatably supported on the end of said longer arm of said L-shaped axle, said wheel member comprising a pair of spaced parallel plates, small axle members securing said plates together adjacent said periphery, and a plurality of small wheels mounted on said small axle member.

5. A wheeled device for vehicles comprising a support adapted to be secured to the vehicle, said support consisting of a pair of spaced parallel plates, bridge means joining said plates into a unit, said support having a pair of aligned axial apertures therethrough, a pair of aligned axial slots therethrough concentric with said axial apertures, and extending 90° from the bottom of said support, an L-shaped axle, the shorter arm of said L-shaped axle being pivotally mounted in said axial aperture and the longer arm of said axle projecting through said concentric axial slot, spring means secured to said longer arm and to said bridging means of said support, tending to hold said longer arm of said axle adjacent the bottom of said slot, a wheel member rotatably supported on the end of said longer arm of said L-shaped axle, said wheel member comprising a pair of spaced parallel plates, small axle members securing said plates together adjacent said periphery, and a plurality of small wheels mounted on said small axle member, said plate members being recessed between adjacent pairs of the small wheels.

In testimony whereof I affix my signature.

RAPHAEL PORCELLO.